(12) United States Patent
McLemore et al.

(10) Patent No.: US 6,244,483 B1
(45) Date of Patent: Jun. 12, 2001

(54) CARRIER DEVICE

(76) Inventors: John D. McLemore, 105 Hickory Ct., Fortson, GA (US) 31906; Don C. McLemore, 450 Brown Ave., Columbus, GA (US) 31906

(*) Notice: Subject to any disclaimer, the term of this patent is extended or adjusted under 35 U.S.C. 154(b) by 0 days.

(21) Appl. No.: 09/382,803

(22) Filed: Aug. 25, 1999

(51) Int. Cl.$^7$ ........................................................ B60R 9/10
(52) U.S. Cl. .......................... 224/521; 224/534; 224/537; 224/924
(58) Field of Search ......................... 224/924, 488, 224/502, 504, 509, 518–524, 533, 537, 534

(56) References Cited

U.S. PATENT DOCUMENTS

| | | | |
|---|---|---|---|
| 3,163,339 | * 12/1964 | Merchant | 224/504 X |
| 3,989,265 | * 11/1976 | Smiley | 224/924 X |
| 4,046,398 | * 9/1977 | Dunwoody | 224/519 X |
| 4,204,702 | 5/1980 | Oltrogge . | |
| 4,318,501 | 3/1982 | Graber . | |
| 4,381,069 | * 4/1983 | Kreck | 224/502 |
| 4,702,401 | 10/1987 | Graber et al. . | |
| 4,815,638 | 3/1989 | Hutyra . | |
| 4,823,997 | 4/1989 | Krieger . | |
| 4,875,608 | 10/1989 | Graber . | |
| 4,938,399 | 7/1990 | Hull et al. . | |
| 5,025,932 | 6/1991 | Jay . | |
| 5,118,018 | 6/1992 | Baldeck . | |
| 5,232,134 | 8/1993 | Allen . | |
| 5,269,446 | 12/1993 | Biehn . | |
| 5,282,555 | 2/1994 | Muir et al. . | |
| 5,373,978 | 12/1994 | Buttchen et al. . | |
| 5,377,886 | 1/1995 | Sickler . | |
| 5,395,020 | 3/1995 | King . | |
| 5,460,304 | * 10/1995 | Porter et al. | 224/521 |
| 5,469,997 | 11/1995 | Carlson . | |
| 5,476,202 | 12/1995 | Lipp . | |
| 5,476,203 | * 12/1995 | Fletcher | 224/924 X |
| 5,497,927 | 3/1996 | Peterson . | |
| 5,549,231 | * 8/1996 | Fletcher et al. | 224/924 X |
| 5,560,526 | 10/1996 | Jantzen et al. . | |
| 5,570,825 | 11/1996 | Cona . | |
| 5,593,139 | * 1/1997 | Julian | 224/521 X |
| 5,647,521 | * 7/1997 | Burgess | 224/924 X |
| 5,690,260 | 11/1997 | Aikins et al. . | |
| 5,695,103 | * 12/1997 | Duvernay et al. | 224/924 X |
| 5,699,985 | * 12/1997 | Vogel | 224/924 X |
| 5,775,555 | 7/1998 | Bloemer et al. . | |
| 5,810,542 | 9/1998 | Ostrander . | |
| 5,820,004 | 10/1998 | Lane . | |

(List continued on next page.)

FOREIGN PATENT DOCUMENTS

2235909 * 3/1991 (GB) ..................................... 224/924

OTHER PUBLICATIONS

Camping World "Master 1997" brochure p. 36.
"Outdoor Cooking Made Simple, e.g. Gas & Charcoal Smokers—Turkey Fryers—Fish Fryers, Camp Cookers—Cookware—Spices—Videos—Cargo Carriers", 1992, pp. 1–22, Masterbuilt Mfg. Inc., Camping Supply Publication (25 Years).

*Primary Examiner*—Gregory M. Vidovich
(74) *Attorney, Agent, or Firm*—Smith, Gambrell & Russell

(57) ABSTRACT

A carrier device that is particularly well suited for use as a vehicle mounted bike carrier. The carrier has a vehicle mounted extension support which supports a side rail structure having a first section extending to a first side of the extension support and a second section extending to a second side of the extension support. The first and second sections are arranged for supporting a respective wheel of an object such as a bike when in use. The carrier device has a modular structure that makes it easily interconnectable with other like carrier structures to form a carrier assembly with the modular carrier structures preferably being arranged in a vertically stacked or staggered arrangement.

38 Claims, 7 Drawing Sheets

U.S. PATENT DOCUMENTS

| | | |
|---|---|---|
| 5,833,074 | 11/1998 | Phillips . |
| 5,850,959 * | 12/1998 | Miller .............................. 224/924 X |
| 5,862,966 | 1/1999 | Mehls . |
| 5,871,131 | 2/1999 | Low et al. . |
| 5,879,102 | 3/1999 | Koliopoutos . |
| 5,881,937 | 3/1999 | Sadler . |
| 5,884,824 | 3/1999 | Spring, Jr. . |
| 5,884,930 * | 3/1999 | Cluth .............................. 224/521 X |
| 6,006,973 * | 12/1999 | Belinky et al. .................. 224/924 X |

* cited by examiner

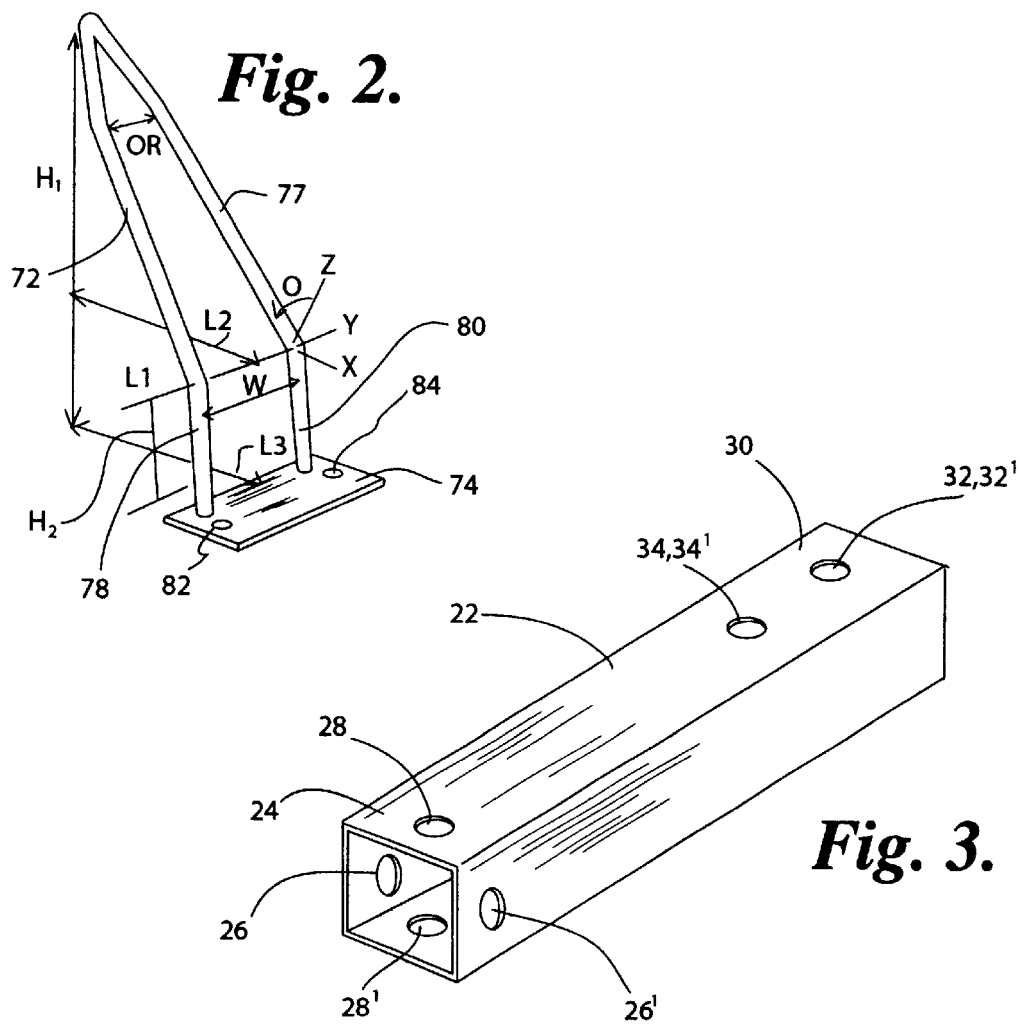

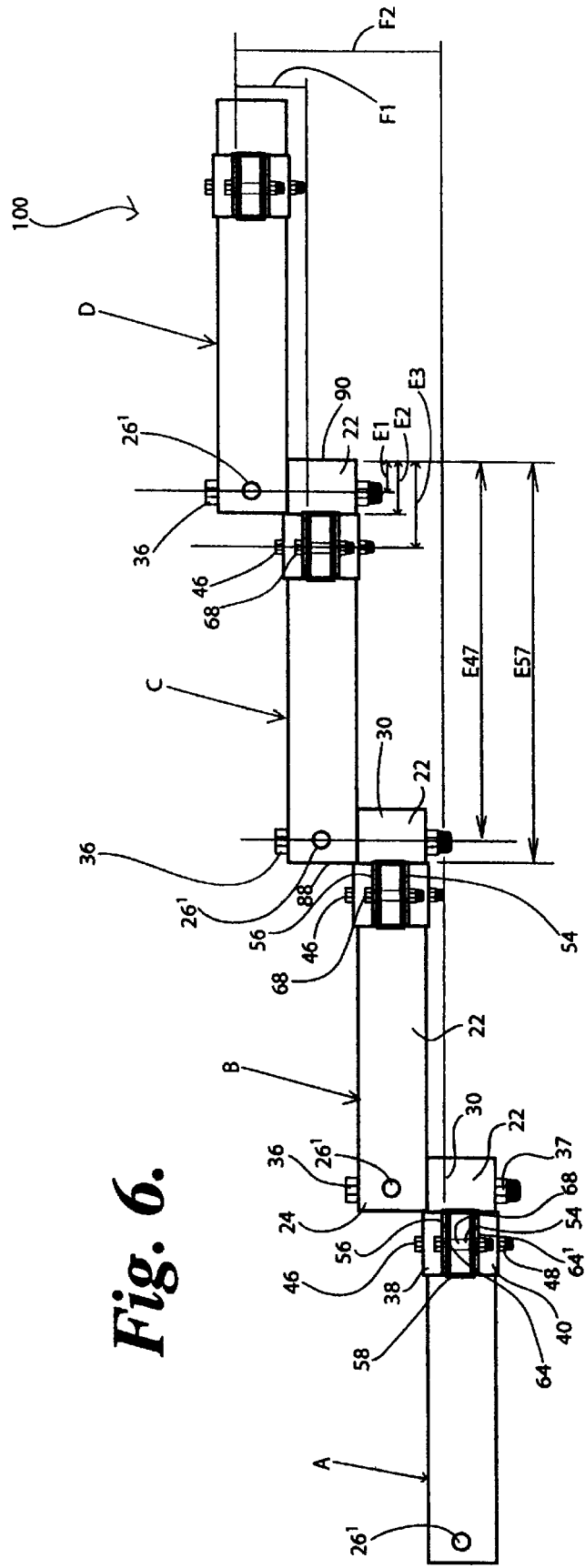

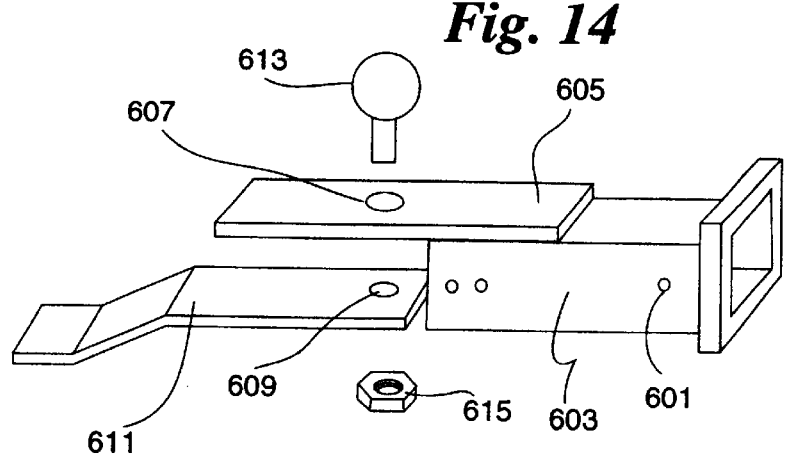
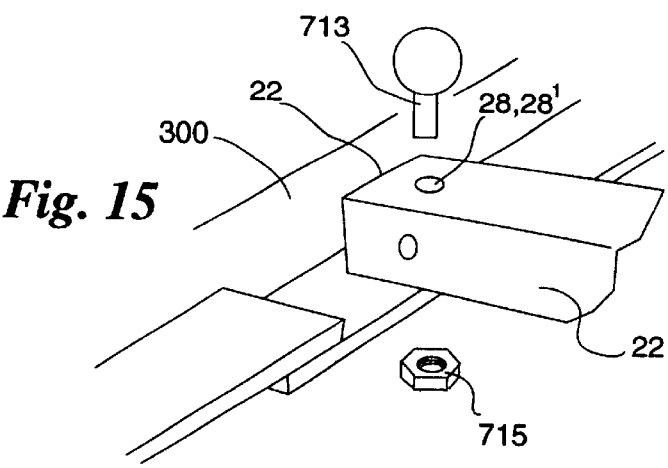
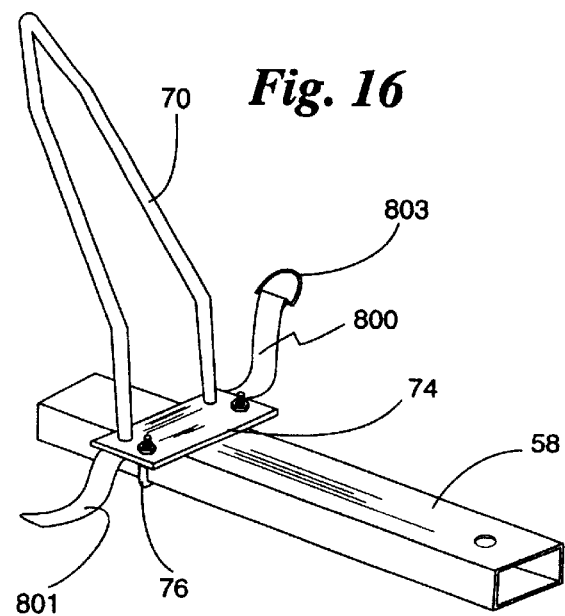

CARRIER DEVICE

FIELD OF THE INVENTION

The present invention relates to a carrier device, which, in one preferred embodiment, is a bike carrier that is suited for attachment to a vehicle. One preferred embodiment of the present invention features a modular carrier structure that is interconnectable with other carrier structures to form a carrier assembly with the modular carrier structures preferably being arranged in a vertically stacked or staggered arrangement.

BACKGROUND OF THE INVENTION

A plurality of bike carrier designs have been developed including compact strap designs that position a bike on the upper surface of a bumper and rely on strap, buckle and trunk hook components to secure the bike to the body of the vehicle. Examples of this type of bike carrier can be seen in U.S. Pat. Nos. 5,118,018 and 5,038,980. In addition to the potential damage to the vehicle created by the hook and buckle components, bike carriers of this type are generally limited to single bike support and also often involve a great deal of set up and adjustment. One advantage of this type of carrier is, however, that they can be made rather compact for shipping and retail shelf space requirements.

There also exists in the art carriers for bikes and other items that include components that attach directly to a vehicle body such as the roof of the vehicle. An example of this type of carrier can be seen in U.S. Pat. No 5,884,824. These type of carriers are applied on a more permanent basis as compared to the hook and strap arrangements described above and thus are typically not easy to remove and instal and also introduce the added possibility of damage to the vehicle body.

The prior art also features bike carriers that are designed to extend out away from the rear end of a vehicle from an attachment point in the bumper region of the vehicle such as from a square hitch common on many vehicles, particularly sports utility vehicles or SUV's. Many of these bicycle carriers include carriers with a relatively lengthy vertical main support bar from the top of which extends horizontal support beams that are provided with clamps or the like to attach to a bicycle generally in an upper region of its frame. Examples of this type of bicycle carrier can be seen in U.S. Pat. Nos. 5,476,202; 5,469,997 and 5,373,978. As having to attach clamping components to the more susceptible painted frame regions of bicycles is undesirable, carriers that attach to a rear end of a vehicle also include carriers that are not designed for attachment to the upper or internal frame structure of a bicycle or other wheeled appliance, but are designed for providing an underlying platform on which the bicycle can be positioned. Prior art examples of this latter type of bicycle carrier include, for example, U.S. Pat. Nos. 5,025,932; 5,377,886; 5,497,927; and 5,570,825. While these type of carriers avoid the drawback of having attachments extending near or in contact with the bicycle's upper, interior frame structure, they generally suffer from a plurality of other problems, such as there being (1) highly complex in design; (2) not very versatile from the standpoint of being able to accommodate for variations in the desired number of bikes (motorbikes or bicycles); (3) not able to accommodate a large number of bikes; not well suited for ease in loading (e.g. difficult wheel or fork latching or the positioning of handle bars of multiple bikes at a common level, conflicting relationship); (4) bulky to the extent of presenting difficulties from the standpoint of, for example, shipping, retailer shelf space requirements and high customer handling weight; and/or (5) formed of a large number of unique components making for high manufacturing and purchase costs as well as difficulty in customer assembly.

SUMMARY OF THE INVENTION

The present invention is directed at providing a carrier device that is directed at avoiding or alleviating the various problems described above as being associated with the prior art. The present invention features a carrier device, which, in one preferred embodiment, is a bike carrier that is suited for attachment to a rear end of a vehicle such as by way of a hitch, tow ball platform or bumper attachment. A preferred embodiment of the present invention features a modular carrier structure that is interconnectable with other carrier structures to form a carrier assembly with the modular carrier structures preferably being arranged in a vertically stacked or staggered arrangement as they extend out away from the rear end of a vehicle. The vertical stacking arrangement provides the advantage of being able to retain an underlying bike support relationship while avoiding having the clearance level of the rearmost bike supporter subject to scraping during certain vehicle travel conditions (e.g., steep driveway aprons or rough terrain such as that often faced during off-road travel). Thus, because of this modular stacking arrangement, a large number of bikes can be carried (e.g., 4) while avoiding scraping problems. In addition, the vertical stacking arrangement positions the handle bars of many bike at alternate levels so as to avoid loading and unloading conflicts.

A preferred embodiment of the present invention also features a modular arrangement wherein a user/customer can choose the number of individual carriers (preferably each a self-contained one bike carrier) desired. For example, a single person may wish to purchase just a single, self contained modular carrier structure and not incur the expense of a multi-support carrier and yet also wish to keep the option open for later expansion. A couple on the other hand, may prefer to purchase two modular carrier structures (one attached to the vehicle and the second attached to the one attached to the vehicle), and yet also keep open the option for later expansion without having to discard or sell the earlier purchased modular carrier structures. Furthermore, with the modular nature of the present invention an expanding family can add on to a prior number of purchased carriers based on the exact number needed. Also, because a preferred embodiment of the invention features modular carrier structures that are the same in all respects or have the exact same design (or at least the same design for all extensive purposes) there is avoided confusion both at the manufacturing level (e.g. which product is being shipped out) and at the customer level (avoiding having to return items because the purchased item was not the one intended). In addition, the preferred modular carrier support of the present invention features a highly symmetrical arrangement wherein all of the components attached to a central element are in same design pairs and mutually useable on either side (making for high efficiency manufacturing and also ease in customer assembly once purchased).

The present invention also has the advantage of being able to have a compact break down arrangement which is beneficial from the shipping container and storage requirements (particularly from the standpoint of a retailer shelf storage requirement which is at a premium). The arrangement of the present invention is also able to provide the numerous advantages described above while avoiding the introduction of a large number of components, particularly a large number of different designed components, which again avoids many of the manufacturing, assembly and use difficulties associated with the prior art.

The present invention also provides a design that allows for rapid loading and unloading of one or a large number of bikes (e.g., 4) while still providing high stability and position maintenance assurance to the user. This is particularly true following the initial sizing of the carrier wheel cradles (which in itself is easy to achieve under the present invention) wherein the user can simply insert and remove the bike from the preadjusted cradles without having to further manipulate the preset cradle position. A preferred embodiment of the invention also includes an easy to perform tie down assembly which relies on the underlying modular carrier structure(s), preferably eye-loop bolts joining together components of the carrier) for quick attachment of a single tie down strap while avoiding the placement of any buckles or the like that can lead to scratching of a bike's painted outer coating.

One of the preferred embodiment of the present invention features a carrier device, comprising a first modular carrier structure having an extension support which includes, at a first end, means for connection with a vehicle and first modular member connection means, and having at a second end second modular member connection means. The modular carrier structure also preferably includes means for supporting an object to be carried such as a rail assembly for below support of the wheels of a bike or the like. The means for supporting an object such as a bike includes a first brace connected with said extension support and a side rail structure to which the brace is attached. The first brace is preferably a first bridge brace having a central portion connected to said extension support and more external sections connected to an under surface of said side rail structure. In addition, in one embodiment of the invention the means for supporting includes a second bridge brace having a central portion connected to said extension support and more external sections connected to an upper surface of said side rail structure.

Each bridge brace is, in one embodiment, a centralized bridge brace structure in that said external sections thereof each extend less than 4 inches out from an adjacent most side section of said extension support. With this type of bridge structure the side rail structure includes a first side rail and a second side rail, with the first side rail having an internal end juxtaposed to said extension support and sandwiched between above and below positioned external sections of said first and second bridge braces, and said second side rail has an internal end juxtaposed to said extension support and sandwiched between above and below positioned external sections of said first and second bridge braces. The first and second side rails also have a common design and are in contact or within ⅛ of an inch of contact with respect to said extension support. Preferably the upper and lower bridge braces have a common design. The extension support also preferably includes a set of aligned holes and said bridge braces include apertures positioned for alignment with said set of aligned holes in said extension support, and said carrier device further comprising a connector that extends through each hole of said set of aligned holes and within each of said apertures of said bridge braces.

A central bolt/nut combination is suitable for the purposes of the present invention, and each of said side rails including a set of aligned side rail holes at respective internal ends, and the external sections of said bridge braces have apertures which are positioned for alignment with vertically aligned side rail holes of a corresponding side rail sandwiched therebetween, and said carrier device further comprises a bolt/nut combinations which extend through respective vertically aligned sets of the side rail holes and within the apertures of corresponding above and below bridge braces.

A carrier device of the present invention also includes a first bike holding member and a second bike holding member supported by respective side rails to opposite sides of said extension support, and wherein said first bike holder is adjustably supported on one of said side rails and free to slidably adjust from an external end of said one of said support rails to said bridge braces. The first bike holder is free to slide along said one of said support rails from a free end thereof to a location at least 4 inches from said extension support without obstruction with respect to the bike carrier in a fully assembled state. The second bike holder is adjustably supported on an oppositely positioned one of said two side rails so as to be freely slidable from a free end of said oppositely positioned one of said two side rails to a location at least 4 inches from said extension section without obstruction.

Each of said bike holding members preferably includes a V-shaped bar section having a pair of legs extending off from a corresponding pair of base extensions, and said base extensions being supported by a sliding member designed for side rail sliding contact, and said holding members including a fix-in-position device for precluding movement of said sliding member, and said V-shaped bar section extending at a greater angle outward of a vertical plane than that assumed by said base extensions.

An alternate embodiment of the invention features a second modular carrier structure having an extension support which includes, at a first end, means for connection with a vehicle and first modular member connection means, and having at a second end second modular member connection means, and said second modular carrier structure further including means for supporting an object to be carried. This embodiment also features first modular member connection means on said second modular carrier structure which carrier structure is connected with the second modular connection means of said first modular carrier structure in a vertically offset arrangement wherein the extension support of said second modular carrier structure has an upper surface above an upper surface of the extension support of said first modular carrier structure.

The extension support of each of said first and second modular carrier structures is preferably a tubular member and the means for connection to a vehicle for each of said first and second modular carrier structures includes a first set of aligned holes, and said first modular member connection means of both said first and second modular carrier structure includes a respective set of aligned holes, and said second modular member connection means of both said first and second modular carrier structures also includes a respective set of aligned holes, and a connector is designed to extend through the aligned holes of the first modular connection means of the second modular carrier structure and through the below positioned aligned holes of the second modular member connection means of said first modular carrier structure. Also the first and second modular carrier structures are interchangeable and of the same design with respect to which connects the vehicle and which connects to the modular carrier structure connected to the vehicle.

A carrier device is also featured in the present invention which includes a third modular carrier structure of a common design as said first and second modular carrier structures and said third modular carrier structure being arranged so as to be vertically offset from said second modular carrier structure upon said third modular carrier structure being interconnected with said second modular carrier structure. A fourth modular unit can also be added to the third in the same manner as described above with respect to the second modular carrier structure to the first. In this way the carrier structures can be attached such that said second modular carrier structure assumes a stacked, vertically offset relationship with respect to said first modular carrier and so on outward depending on the number of carriers added on.

The invention also features a carrier device for supporting bikes that comprises a first modular carrier structure having a bike support platform, a second modular carrier structure having a bike support platform; and means for releasable interconnection of a forward end of said second modular carrier structure to a rear end of said first modular carrier structure such that said second modular carrier structure is positioned vertically above and offset with respect to said first modular carrier structure.

Also, the first and second modular carrier structures preferably each include centrally positioned extension supports, and the extension support of the second modular carrier structure is laid on top of a rear portion of the extension support of said first modular carrier structure, and said means for interconnecting includes a connection member which extends through each extension support so as to lock said extension supports in a stacked relationship.

The present invention also features a bike carrier device that comprises an extension support; a side rail structure supported by said central extension support and having side rail sections extending to opposite sides of said extension support and each of said side rail sections being in contact with said extension support. There is included a pair of wheel cradle assemblies positioned on said side rail structure on opposite sides of said extension support and at least one of said cradles being adapted for slidable adjustment on a respective, supporting side rail section; and at least one of said wheel cradle assemblies including a releasable fix-in-position device for fixing a corresponding one of said wheel cradle assemblies in a desired position on said side rail structure. The device also includes a wheel hold down device which includes a flexible member pinched between said cradle and a supporting one of said slide rail upon said fix-in-position device being in a locked state. The flexible member is preferably a nylon strap with securement means for fixing one section of the strap to another section so as to form a wheel locking loop. Preferably, the pinching cradle structure includes a V-shaped section and a pair of base sections, and said V-shaped section extends from vertical at a first angle between 30 and 60 degrees and said base sections extend at 0 to 10 degrees with respect to a vertical plane.

BRIEF DESCRIPTION OF THE DRAWINGS

FIG. 2 shows a perspective view of one of the two cradles shown in FIG. 1.

FIG. 3 shows a perspective view of the support extension of FIG. 1.

FIG. 4 shows a perspective view of one of the two bridge braces shown in FIG. 1.

FIG. 5 shows a perspective view of one of the two support rails shown in FIG. 1.

FIG. 6 shows a side elevational view of a plurality of interconnected modular carrier structures with the cradles removed.

FIG. 9 shows a perspective view of a pair of the modular carrier structures of FIG. 8 interconnected with one another and with the second added modular carrier structure shown in dotted lines to illustrate the optional nature of adding on modular carrier structures to a more internal positioned modular carrier structure with respect to a supporting vehicle or the like.

FIG. 14 shows an adaptor which can be used to modify a vehicle without a square hitch in its rear bumper area to one which includes a square hitch attachment and is readily able to handle a preferred modular carrier structure of the present invention or a non-modular carrier of the present invention.

FIG. 15 shows an arrangement wherein the extension support of the present invention is attached to a tow ball support plate at the rear of a vehicle.

FIG. 16 shows a wheel hold down assembly secured to the rail by the cradle.

DETAILED DESCRIPTION OF THE PREFERRED EMBODIMENTS

Figure 1:
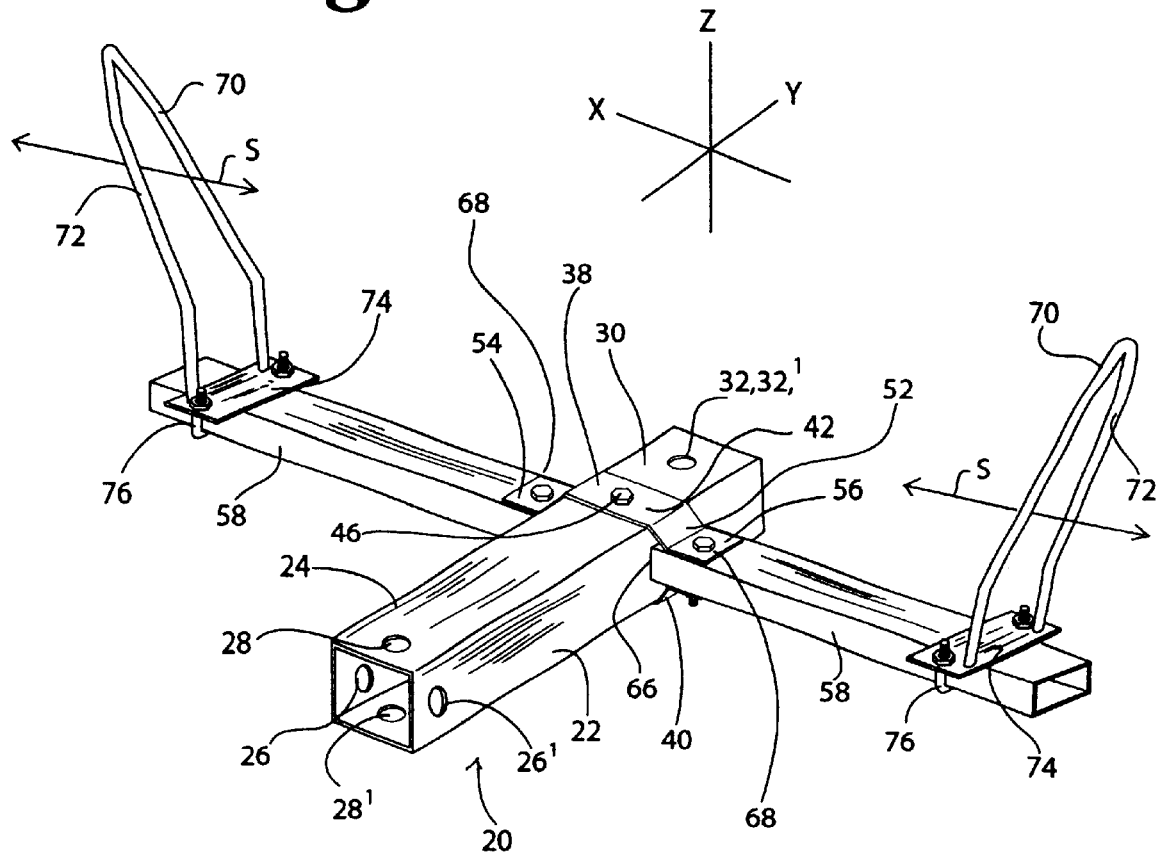
FIG. 1 shows a perspective view of a carrier device of the present invention which in this figure is a modular carrier structure.
Figure 7:
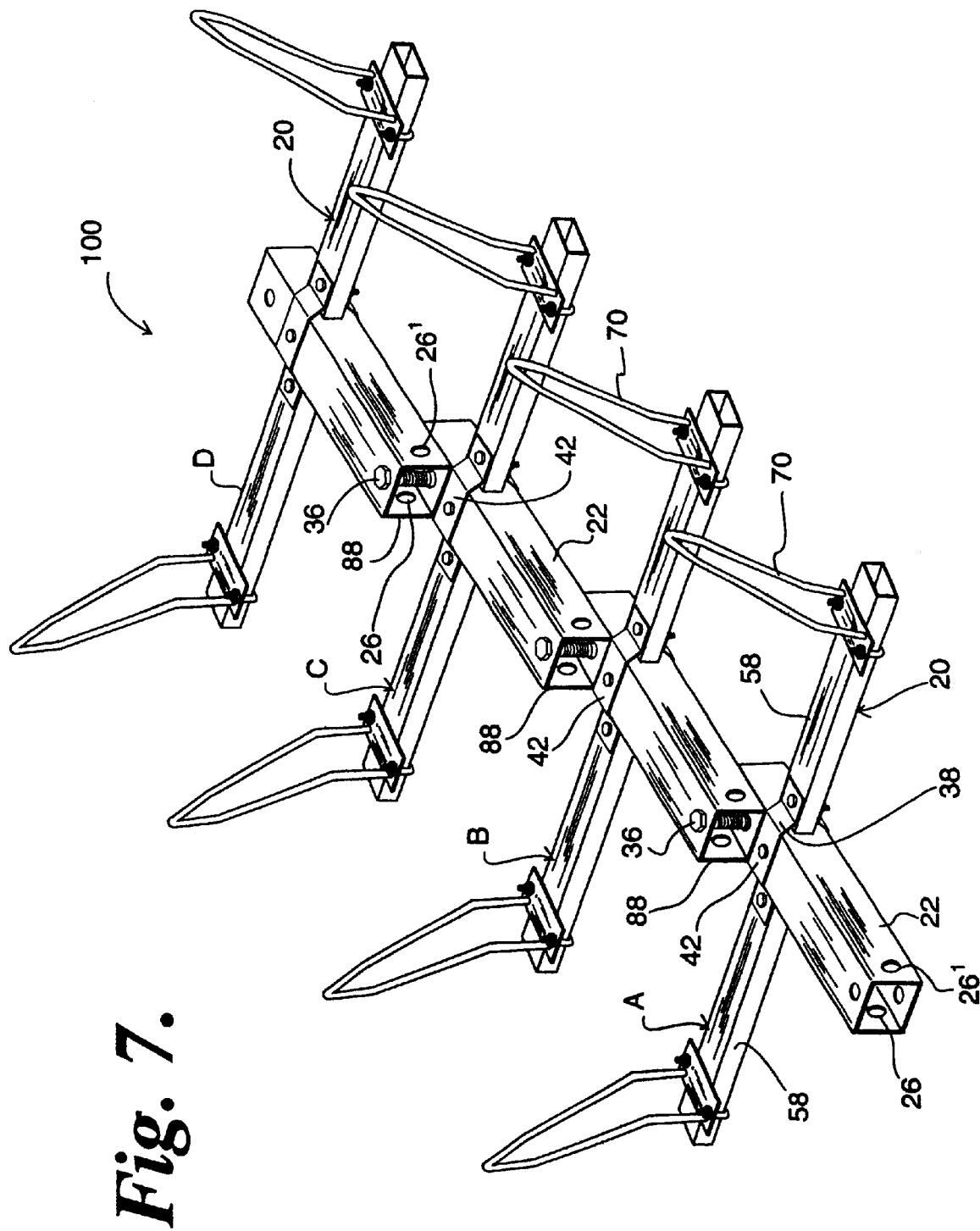
FIG. 7 shows a perspective view of that which is shown in FIG. 6 except with the cradles shown in FIG. 1 included for each modular carrier structure.

FIG. 1 shows a perspective view of modular carrier structure 20 of the present invention which in the illustrated embodiment features extension support 22. Extension support 22 is preferably a tubular member having, at interior end 24, two sets of aligned holes. The first set features horizontally aligned holes 26,26' which are sized to receive a clevis pin or the like for locking extension support 22 following a telescopic insertion within a reception cavity of a vehicle trailer hitch or the like (see FIG. 10 for an example of a square hitch attachment). Extension support 22 can also have a variety of alternate vehicle attachment means so long as such attachment means provides a high level of stability and extension support securement to the carrier device. The second set of holes 28,28' is vertically aligned for use in interconnecting with another modular carrier structure having the same configuration or a similar configuration as discussed in greater detail below. The opposite or exterior end 30 of extension support 22 features a second set of vertically aligned holes 32,32' (only the top hole being shown in FIG. 1, but it being understood that a bottom hole is aligned therewith as shown at the opposite end of support 22 with respect to holes 28,28'). Vertically aligned holes 32,32' are designed for alignment with holes 28,28' of another modular carrier structure to achieve a stacked arrangement of modular carrier structures as shown in FIGS. 6 and 7 and as explained in greater detail below.

As can be seen from FIG. 3, between the two sets of vertically aligned holes (28,28' and 32, 32'), there is positioned a third set of vertically aligned holes 34,34', which third set is preferably positioned closer to hole set 32,32' than set 28,28' to provide a sufficient degree of extension clearance from either the bumper region of the vehicle or a more internal one of a plurality of the stacked modular carrier structures. Under the present invention there can also be provided a series of spaced pairs of vertically aligned holes along the length (or a portion of that length) for providing for variations as to the degree to which a more external tube is spaced from a more internal tube once telescopically arranged as explained in greater detail below. With this arrangement the most internal tube can be positioned to extend out away from the vehicle in a maximum extension setting while more external tubes can be less extended if a more compact arrangement for supported bikes or the like is deemed desirable.

While a variety of sizes and dimensions and materials are considered suited for use under the present invention, a 2"×2" hollow tubular member formed of a relatively heavy gauge steel material (e.g. 13 gauge steel which has a thickness of about ⅛ of an inch) represents some of the preferred characteristics for extension support 22. Extension support 22 also preferably has a longitudinal extension length of about 6 to 18 inches with 12 inches being preferred. The first and second sets of holes (28,28' and 32,32') are preferably spaced such that each hole's edge is at least ½ inch inward of a respective end edge of tubular extension support 22 and more preferably from ½ inch to 2 inches of that edge to ensure sufficient strength to withstand the forces which develop when a clevis pin for use with a vehicle trailer hitch or a modular interconnector bolt such as that represented by reference number 36 in FIG. 6 is inserted through the aligned holes (28,28' and 30,32'). Also, the location of the third set of vertically aligned holes 34,34' preferably falls closer to the second set of vertically aligned holes 32,32' than to the first set of vertically aligned holes. For example, when considering the total distance between the central points of the first and second sets of vertically aligned holes as representing 100%, a preferred location for the third set of aligned holes is within the region extending 50–95% with the 0% point being the center point of the first vertical set of aligned holes. A range of 75–85% is even more preferred with 80% being the most preferred. For example, a 12 inch length for extension support 22 with each set of vertically aligned holes (28,28' and 32,32') having a center point 1 inch from the respective closest edge, and the third set of vertically aligned holes 34,34' having a central point 2 inches from that of vertically aligned holes (32,32') and thus 3 inches in from the closest extension support edge. The horizontally aligned holes (26,26') are preferably centered on the tubular side walls of extension support 22 so as to have a central point one inch from the top and bottom surfaces of extension support 22. Also, the sets of aligned holes 28,28' and 26,26' preferably fall on a common cross-sectional plane although a staggered arrangement is also a feature of the present invention for added strength particularly when using a thinner wall design or a tube with smaller dimension (e.g. a 1 ¼ inch square tube to suit the smaller 1 ¼ square hitch size found on many vehicles rather than the also common 2 inch square hitch size).

FIGS. 1 and 6 further illustrate upper bridge brace 38 and lower bridge brace 40, which are preferably one in the same and arranged in mirror image. FIG. 4 is thus illustrative of both upper and lower bridge braces 38,40. As shown by FIGS. 1 and 4 each bridge brace 38,40 features an extension support contact section 42 which conforms to the supporting or contacting surface of extension support 22. For example, with the preferred 2"×2" tubular arrangement for extension support 22, contact section 42 has a corresponding contact surface length (extending transverse to the longitudinal extension of support 22) of 2 inches. Each bridge brace also features aperture 44 provided in a central region of contact section 42 for alignment with the third set of vertically aligned holes 34,34'. Thus with both the upper and lower bridge braces in position with respect to extension support 22, intermediate bridge bolt 46 (or any other suitable interconnecting member) is free to pass through the upper bridge brace's central aperture 44, the third set of aligned holes 34,34' of extension support 22 and the lower bridge brace's central aperture 44. Threaded nut 48 or some other type of fixing means is used to place the two bridge braces in a compression or at least an interlocked relationship with respect to the tubular extension support therebetween. Intermediate bridge bolt 46 is shown in FIG. 6 as extending through both of the preferably ⅛ inch thick steel bridge plates and the 2 inch tubular extension support 22 and thus intermediate bolt 46 is preferably a ½ inch or so greater in length to provide room for nut 48 (e.g., a 2.75 inch long bolt of ⅝ inch diameter). With the preferred tubular nature of extension support 22 it would also be possible to use a pair of nut-shorter bolt combinations to hold the respective upper and lower brace bridges to the extension support.

Each bridge brace also features left and right sloping extensions 50,52 extending out to opposite sides of contact section 42 (e.g. 30–60° and preferably 45° to the horizontal) for a relatively short distance of, for example, about ½ inch to 1 inch and also down for ½ inch when a 2"×2" extension support is used and a 1"×2" side rail 58 (FIG. 5) is involved. Extending farther out from the respective external ends of sloping sections are side rail contact sections 54 and 56 shown to be extending along a common horizontal plane which is parallel to that assumed by extension support contact section 42. Apertures 60 and 62 are provided in a central region of side rail contact sections as best shown in FIG. 4. The above described arrangement for bridge braces with the sloping sections represents an easily formed structure and thus is preferable from that standpoint although other designs are possible including, for example, a bridge brace featuring a planar central contact surface, transverse (vertical) legs from which extend the side horizontal side rail contact sections.

With reference to FIGS. 1 and 5, modular carrier structure 20 features two of side rails 58 with each preferably being the same hollow, tubular member (e.g. formed by extrusion) and preferably also formed of the same gauge steel material as that of extension support 22. Thus, in addition to the two clamping bridge braces attached to the central extension support being identical to each other, the two side rails are identical with each other and hence the interconnecting bolts are the same as well. This makes for highly efficient manufacturing and assembly (either by customer or upstream in the distribution flow). The side rails 58 shown in FIG. 1 are also preferably of a 1"×2" cross section with the longer side extending in the same longitudinal direction as the longitudinal extension of extension member 22. The length of side rail 58 is preferably from 15 to 30 inches with this range being well suited for the support of the wide variety of different standard bike sizes which support represents the preferred use of the modular carrier structure of the present invention (e.g., with the use of proper thickness and/or material for the above described other devices can be supported by the carrier of the present invention including, for example, dirt bikes, mopeds, scooters, etc.). A preferred length of side rail 58 is 23 inches such that the total transverse extension is 2 times the side rail length plus the preferred 2 inch transverse width of extension section 22 as the interior end edge 66 of rails 58 are in a flush contact relationship with respect to the side walls of extension section 22. FIG. 5 also illustrates that side rail 58 features a fourth pair of vertically aligned holes 64,64' provided close to the planar interior end edge 66 of side rail 58 (e.g., the center of holes 64,64' is within 1 to 4 inches of edge 66 with 1.5 inches being preferred). While even longer length side rails are possible, a maximum extension of 62 inches in the transverse direction is preferred as that is compatible with many common vehicle sizes used to support the carrier of the present invention.

As shown in FIG. 1, upper and lower braces 38,40 are preferably dimensioned to lock in place the left and right side rails 58 shown in FIG. 1 at a central or intermediate location along the side walls of extension support 22. This locking function is achieved by the insertion of a locking member such as bolt-nut combination 68 which extends through the upper plates' respective side rail contact section (56,54), through the aligned holes 64,64' and then through the opposing side rail extension (54,56) as best shown in FIG. 6. Thus, the upper and lower braces and locking bolts 68 provide clamping or interconnection means to both place and hold rigidly end edge 66 of rail 58 in a flush, abutting relationship such that the intermediately positioned left and right side rails are precluded from rotation about a vertical axis (an axis parallel with the illustrated Z axis in FIG. 1) while the intermediate bridge bolt precludes any sliding of the upper and lower braces (and secured side rails 58) along the illustrated longitudinal or Y axis direction extending along the elongated length of extension support 22. The bridge braces also function to prevent rotation of side rails 58 either with respect to a Y-axis pivot axis or an X-axis pivot axis (e.g., both through the extra support of the interconnected braces as well as their positioning of the interior ends of side rail 58 with the side walls of support 22). The above described abutment relation includes both an initial assembly abutment or a small spacing (less than an ⅛ inch) which results in a rapid abutment relationship upon a small amount of relative shifting of the side rails' interior end with respect to support 22, although an initial or at assembly flush relationship is preferred.

FIG. 1 includes an illustration of two cradle assemblies 70 provided on the outer ends of the left and right side rails 58. Cradle assembly 70 comprises holding member 72, slide plate 74 and U-bolt 76. FIG. 2 shows in greater detail holding member 72 and slide plate 74. Holding member 72 is preferably in the form of a single circular cross-section rod or bar which is configured to have upper V-shaped section 77 with a pair of parallel base extensions 78,80 extending from the ends of the spaced apart legs of the V-shaped extension. The lower end of the parallel base extensions 78,80 is rigidly secured to slide plate 74 preferably by way of a weld. The spacing apart along slide plate is represented by "w" which is preferably about 2.5 inches. Slide plate 74 (which preferably is a 3.25×2 inch plate) features U-bolt reception holes 82, 84 (or alternatively open edge notches in view of the configuration of a U-bolt 76 providing sufficient securement). Slide plate 74 preferably is sized along a Y-axis direction so as to cover the upper surface of extension support 22 and extends transversely out far enough on each side to accommodate the vertical legs of the U-shaped bolt.

FIG. 2 further illustrates a preferred configuration for holding member with its V-shaped 77 section being sloped outward along the X-axis at angle θ (preferably falling within the range of 30 to 60° and more preferably about 45°) with respect to the Z-axis and V-shaped section defines angle α which preferably falls in the range of 10 to 35° with an angle of 25° being preferred. The base extensions 78, 80 are preferably less angled than the V-shaped extension (e.g. vertical (0°) to 10°) with the vertical being the more preferred. In a preferred embodiment of the invention, height H1 represents the maximum vertical height of V-shaped section 77 off from a plane lying flush on the top surface of the typically ⅛ inch thick slide plate 74 up to the V-shaped section's apex. Height H1 preferably ranges from 10 to 30 inches with 18–20 inches being the more preferred height which is well suited for providing a generally universal wheel reception configuration. Length L1 represents the length which the combination of the V-shaped section and base sections run outward along the X-axis to a point of intersection with the lower end of height H1. The preferred value for L1 is 8 to 16 inches with 13 inches being the more preferred. H2 represents the preferred height for the vertical rise value of the upper end of base sections 78 or 80. The preferred height H2 for base sections 78,80 is about ¼ to a ⅓ of that of H1 (e.g., a range of 2 to 8 inches with 3 inches being a particularly well suited height for H2. L2 represents the X-axis run corresponding to the X-axis run for just the V-shaped section 77. While L3 illustrates the X-axis run for base sections 78 and 80 such that L1–L2=L3. With the base extensions 78,80 extending only vertically, the length L1 would be equal to L2 and L3 would equal 0.

The above described configuration of holding member 72 is advantageous from the standpoint of providing an improved hold-in-position function with respect to the wheel of a bicycle or the like in that the combination of the close to or at vertical orientation of the base extensions and the outward sloping V-shaped section allows the holding member to position a relatively large percentage of its contact surface close in toward the central region of the wheel with the point of tire abutment with the notch of the V-shaped section 77 representing the limiting factor of how close in the interior of bar member 72 can be positioned with respect to the frame of the bicycle. The angle for the V-shaped notch of the V-shaped section is designed to provide a great deal of bike position control due to the pinching nature of the notch without causing tire or wheel damage and/or causing the wheel to make contact at a location on the bar which is not near or at its apex. The V-shaped section can also be provided in a variety of angle sizes to accommodate the intended use. For example, mountain bikes typically have larger tire widths than touring or racing bikes while motor bikes have even large tire widths. The above noted angle of 25° represents an angle well suited for a wide variety of various style bike tire sizes.

An advantageous feature of the present invention is its ability to accommodate a wide variety of bike sizes despite a preferred embodiment also being highly modular in nature. That is, the design of the present invention includes the ability to have a single carrier snugly accommodate a large variety of different height and length bikes (e.g. adult and children size bikes). This versatility is partly due to the ease with which cradle assemblies 70 can be shifted along respective side rails 58 which, in this context, can be considered as slide rails. Upon loosening one (or both) nuts associated with U-bolt 76, the smooth, planar underlying surface of slide plate is easily slid along slide rails 58 as represented by slide direction S for each of the illustrated cradle assemblies 70 shown in FIG. 1. In this way an operator can loosen either a single one or both of cradle assemblies of a single carrier 20 with a bicycle positioned therebetween and slide one or both of the cradle assemblies until the bicycle is placed in a snug, held-in-position state upon a lock down of the cradle assemblies (or assembly if only one was loosened for adjustment). The operator can also transversely stagger the bicycles with respect to a multiple interconnected set of modular carriers if this helps in removal and/or reinsertion of the bikes. Also, once a particular sized bike is accommodated, adjustments would not always be a necessity for future reinsertion. While a loosening of the nuts for the U-bolt clamps described above is easily accomplished with a wrench or the like, a non-tool clamping means is also contemplated for use in the present invention.

Figure 2A:
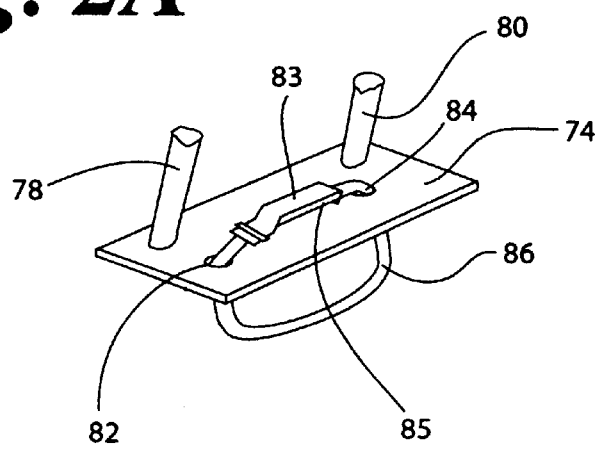
FIG. 2A shows in cut-away an alternate embodiment of a cradle assembly with quick release slide plate clamping means.

An example of one possible "non-tool" clamping means is shown in FIG. 2A wherein instead of a U-bolt clamping means an over-center latch assembly 83 which includes over-center latch 85 such as of the type used on ski-boots with flexible metal cable 86 attached to the respective ends of latch 85. To avoid cable abrasion and/or increase the holes can have a smoothed, curved interior reception recess or a suitable low friction grommet (not shown) or the like can be provided in holes 82 and 84 and/or a low friction cable sheathing can be relied upon.

The cradle type arrangement described above represents a preferred bicycle holding means of the present invention in that it provides a sufficient bicycle positioning holding function particularly when supplemented with a strap hold down arrangement like that described below and/or a dual bicycle interlock mechanism. Alternative hold down mechanisms are also possible such as one of the various conventional direct fork attachment arrangement such as that described in U.S. Pat. No. 5,377,886 to Sickler. Such direct fork attachment devices, however, are less preferable from the standpoint that it is more time consuming to load, unload and have the bicycle in a ready to rate state. In addition, finding a proper storage location for the released wheel also adds undesirable complexity in the process of carrying a bicycle.

FIG. 6 shows a side elevational view of a plurality of interconnected modular carrier structures 20 like that shown in FIG. 1 to provide an alternate bike carrier embodiment represented by 100 in FIG. 6. To facilitate the discussion the cradle assemblies 70 have been removed from FIG. 6, but can be seen in the perspective view of bike carrier 100 provided in FIG. 7. Because of the modular nature of the individual modular carrier structure 20 of the present invention one, two, three, four and even more (although four is the recommended maximum for most vehicles from the standpoint of avoiding too far a shifting of gravity of the bike carrier away from the hitch vehicle attachment point) individual modular structures can be combined. FIGS. 6 and 7 illustrate four modular carrier structures 20 interconnected with the individual modular structures identified as A, B,C and D in FIGS. 6 and 7. As illustrated in these two figures each modular member A,B,C and D is of exactly the same structure, although variations are also possible such as only A having the horizontally aligned clevis pin reception holes 26, 26'. However, the fact that each modular structure is exactly the same provides a greater degree of options to the user as well as less confusion during the time of purchase. The similarity in each modular structure 20 also greatly simplifies the manufacturing and distribution process for the manufacturer. The modular nature of the present invention is particularly advantageous from the standpoint of allowing a purchaser to choose the exact configuration best suited for that person at the present time as well as freedom to easily modify the carrier in the event that circumstances warrant. For example, a single person may find a single modular carrier structure best suited for his or her needs, while a couple may prefer two modular carrier structures. A single child family may desire a three way combination with the potential of adding a fourth upon an increase in family size.

As shown by FIGS. 6 and 7 an increase in the number of modular carrier structures is easily accomplished by the insertion of a single connection member represented in a preferred embodiment by modular structure interconnector bolt 36 which is preferably a ⅝ inch diameter 5 inch length bolt which compresses the bottom surface of the interior end 24 of modular carrier structure B against the upper surface of the outer end 30 of modular carrier structure A. The same connection process is also carried out with respect to connecting modular carrier structure C to B as well as D to C. In addition, the bottom region of the end edge 88 of each of the interior ends of tubes 22 for modular carrier structures B,C and D is placed in an abutting relationship (preferably within direct, flush contact or, less preferably, within ¹⁄₁₆ of an inch so as to ensure contact with minimal position shifting) with respect to contact section 42 of a corresponding upper bridge brace 38. This arrangement adds to the structural rigidity of the bicycle carrier 100 by helping to prevent Z-axis rotation of a more outward modular structure member 20 with respect to a more internal one. The abutting relationship also helps in the prevention of any Y-axis shifting which lessens the stress placed on bolts 36. This arrangement also avoids having to provide structural components along essentially the entire length of rails 58 (only the preferably 1.5 to 3 inch sections 54 and 56 of bridge braces 42 extend out along the side rail and to even a lesser extent the sloping sections 50,52) which increases the bike size adjustment possibilities for cradles 70 and thus increases the versatility of the present invention.

As shown in FIG. 6, an outer modular carrier structure extends over the upper surface into contact with an adjacent bridge section a distance represented by E2 which preferably ranges from 1 to 4 inches and more preferably is about 2 inches. The central axis of bolt 36 extends through the vertically stacked structures C and D at about the half way point as represented by length E1 which under this arrangement is equal to E2/2. The central axis of intermediate bridge bolt 46 is shown in FIG. 6 to be a distance E3 from the outermost edge 90 of tube 22 which distance is preferably 2 to 5 inches and more preferably about 3 inches or 1 inch greater than E2. Distance E4 represents the distance from the noted edge 90 to the central axis of the more internal or lower of the two modular connector bolts 36 extending through tube 22 of modular carrier structure C. Distance E5 represents the preferred length of tube 22 which, in this embodiment, is preferably 8 to 16 inches and more preferably 12. E4 is preferably a ½ inch to 3 inches less than E5.

FIGS. 6 and 7 also illustrate the vertically stepped nature of the bicycle carrier 100 made possible by the above below connection of the modular carrier structures A–D. The progressive increase in height of the modular carrier structures A–D provides the advantage of a bicycle carrier that is less prone to scraping when a vehicle traverses over a region with a sharp change in slope such as found on the road end of many driveways or over rough terrain and also avoids bicycle contact particularly in the handlebar region. during loading and travel. FIG. 6 illustrates the progressive increase in height in going from one stacked modular structure by reference "F1" which is taken from the upper surface of the side rail 58 of modular carrier structure C to that of D. The upper surface of rail 58 is opted as a reference plane as that is the general location of where a bicycle tire will be in contact during travel of a supporting vehicle (depending on the wheel diameter many bike sizes will be supported instead by the slide plates of the cradle assembly). The value of F1 is preferably 1.0 to 2.5 and more preferably 2 inches (which corresponds with the preferred 2"×2" tube 22 dimensions and a standard hitch size) and 1.25 which corresponds to another common hitch size. F2 in FIG. 6 represents the total step up for 3 added modular carrier structures (B–D) to the modular carrier structure secured to the vehicle (A). Thus, the preferred total step up in height F2 is preferably 3.0 to 10.0 inches with 6 inches being preferred.

Figure 8:
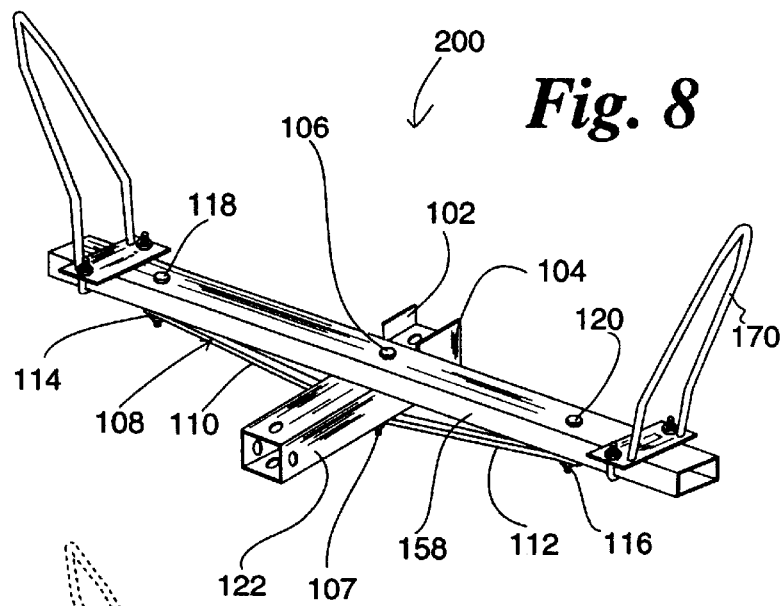
FIG. 8 shows a perspective view of an alternate embodiment of a carrier device of the present invention which is also features a modular carrier structure.
Figure 9:
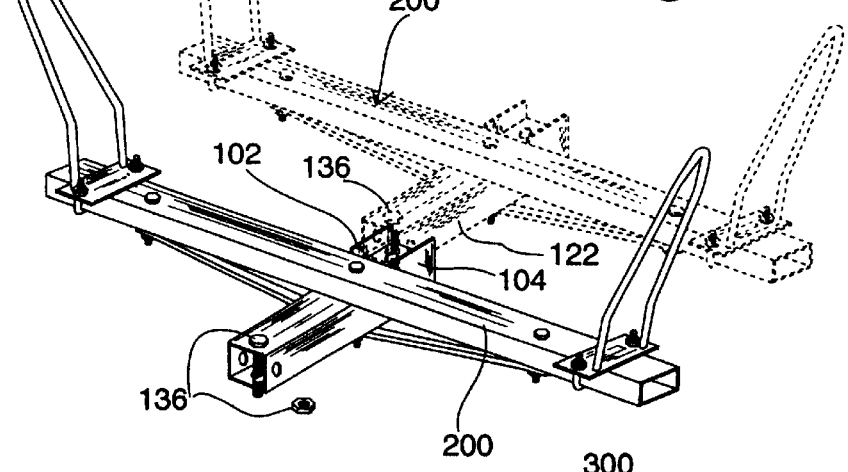
Figure 10:
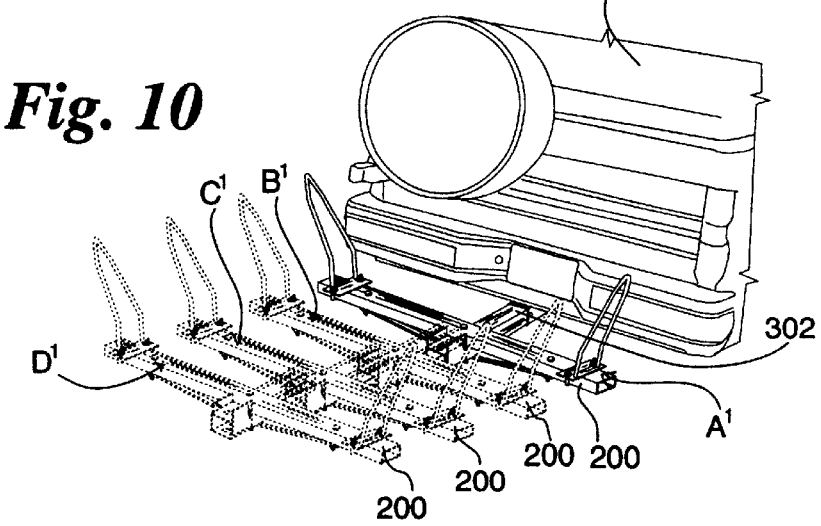
FIG. 10 expands upon that which is shown in FIG. 9 by showing in dotted lines three added on interconnected modular carrier structures to a solid line interior modular base structure as well as a supporting sports utility vehicle with supporting square hitch.

FIGS. 8–10 illustrate an alternate embodiment of the present invention which shares many similarities with that of the earlier embodiment and thus only the differences are emphasized below. With reference to FIG. 8, modular carrier structure 200 is shown as having extension support tube 122 as in the earlier embodiment. Attached to opposite sides of tube 122 at its outer end is a pair of vertical flanges 102 and 104 which are preferably welded or otherwise fixedly secured to tube 122. These flanges preferably extend about an inch up off the upper surface of tube 122 and preferably about 2 inches along the tube 122. Rather than a pair of side rails in contact with the side walls of the extension support or tube as described for the earlier embodiment, a single side rail 158 extends over and across the upper surface of tube 122 and is held in position with bolt/nut combination 106 so as to be in an abutting relationship with the interior vertical edges of the portion of flanges 102,104 extending vertically above tube 122. This relationship helps avoid Z-axis rotation of side rail 158 on a centralized basis. To provide added structural strength, bridge brace 108 is provided. Bridge brace 158 is preferably a monolithic unit with a central horizontal section 107 with an upper surface placed in flush compression relationship with the underside of tube 122 by way of bolt/nut combination 106. Brace 108 further includes sloped sections 110 and 112 that preferably have slope at an angle similar to sloped sections 50 and 52 of the earlier embodiment with 45° with respect to the horizontal being preferred. Brace 108 preferably is formed from a single bar (e.g., ¼" X 1"bar) that is bent into the illustrated shape. Thus, extending out away and integral with respective ends of section 110 and 112 are side rail contact sections 114 and 116 that preferably are also horizontal and include holes for receipt of bolt/nut combinations 118 and 120.

Modular carrier structure 200 also is shown to include cradles 170 similar to cradles 70 described above for the earlier embodiment except for the plates being provided with open edge slots rather than holes. While the presence of extended bridge braces provides underneath support to the side rails in a region of 50 to 80% and more preferably 75% out from the center bolt 106, the presence of bolt/nut combinations 118 and 120 in this regions disrupt to a certain degree the freedom of cradle shifting. Thus the open notches help a user detach the cradle from the side rail to move it sufficiently inward of one of bolt/nut combinations 118,120 if a small bicycle is involved. Despite the presence of the bolt/nut combinations the degree of adjustability is sufficient to cover a wide variety of bike sizes. Also, as noted above as a person will typically retain the same bike for awhile, once the adjustment is made, the person can easily load the bike without adjustments having to be made. This is particularly advantageous with respect to a three or four bike carrier as each person in a family can have a designated loading slot on the bike carrier which is preadjusted such that the whole family's bike collection can be quickly and easily loaded and unloaded each time.

FIG. 9 illustrates a vertical stacking of a pair of modular carrier structures 200 through use of nut/bolt combination 136 having a similar size as that used in the last embodiment. As shown in FIG. 9 the flanges 102 and 104 are spaced so as to be in sliding contact or preferably at least within ⅟32 to ⅛ of an inch of the corresponding side walls of tube 122 to preclude a large degree of undesirable shifting.

FIG. 10 illustrates a stacked arrangement for four of modular carrier structures 200 represented by A',B',C' and D'. As shown in FIG. 10, the tubular member 122 of modular carrier A' is telescopically received within hitch 302 of vehicle 300 and locked in place with a clevis pin as is, per se, known in the art.

Figure 11:
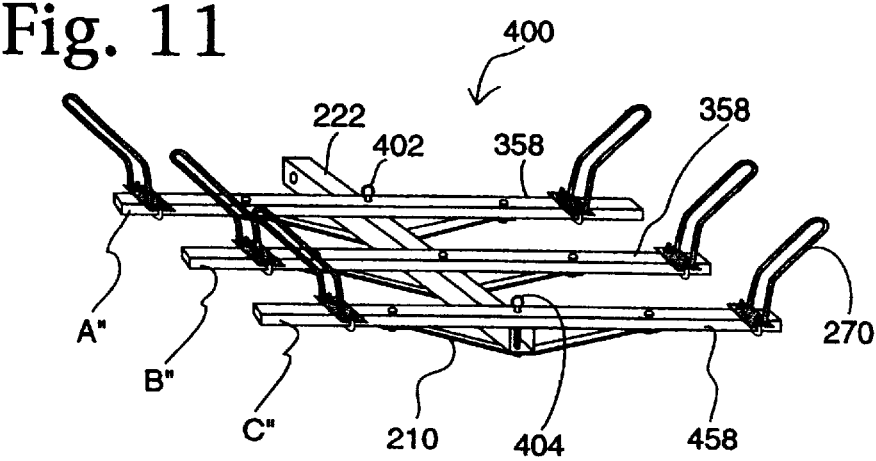
FIG. 11 shows a perspective view of a carrier device of the present invention which is a non-modular carrier device featuring a monolithic central support extension.
Figure 12:
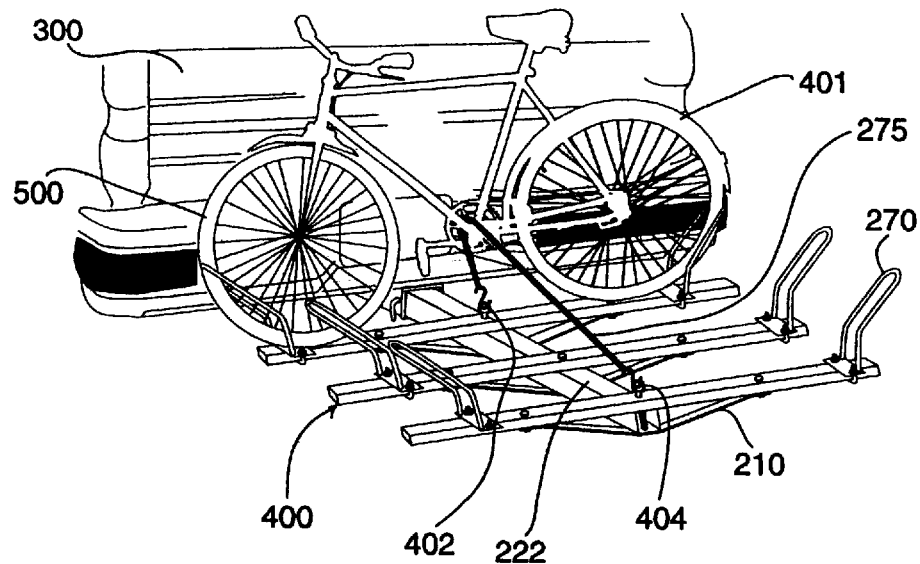
FIG. 12 shows the carrier device of FIG. 11 in operation supporting a bicycle and attached to the rear end of a vehicle.

FIGS. 11 and 12 illustrate an alternate embodiment of the present invention which features bike carrier 400 which includes a monolithic extension support 222 which results in a non-step up arrangement. The side rails 358 of the carrier 400 extend across the upper surface of monolithic extension support 222 and thus lie in a common plane. The manner of connection is similar to that of the embodiment of FIG. 8 in the use of a monolithic side rail and an underlying bridge brace 210 for each side rail. Cradle assemblies 270 are generally similar to that of the earlier embodiment but include a U-shaped outer extremity as opposed to the V-shaped section of the earlier described cradle embodiments. FIG. 11 also shows the advantageous providing of strap tie down eyelets that are provided by the use of eye-bolts 402 and 404 preferably provided on the interior and exteriormost side rails. (and functioning as side rail/ extension support connectors as well). As shown in FIG. 12 by applying the opposite ends of the body of elastomeric strap 275 to the eye-bolts 402 and 404 across bike 401, there is provided a secure tie down arrangement that avoids bike frame scraping. FIGS. 11 and 12 also show that preferred number of bike support locations on this carrier is three due to a lack of a step up arrangement as in the last embodiments. FIG. 12 also shows loaded bike 500 supported on carrier 400 which is generally the same loading arrangement that would exist for the other embodiments. FIG. 12 also shows the use of a single strap to help lock in position the bike with respect to the carrier.

Figure 13:
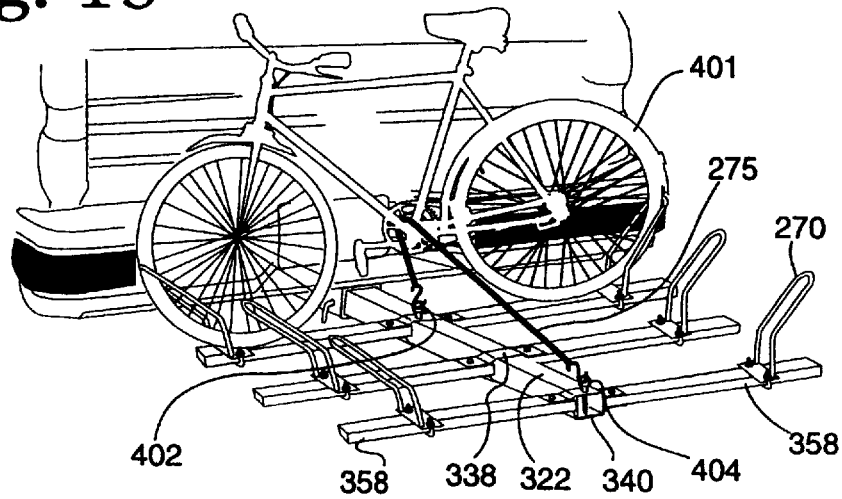
FIG. 13 shows a perspective view of a non-modular carrier device like that shown in FIG. 12 except having bridge bracing designed like that for the modular carrier structure shown in FIG. 1.

FIG. 13 shows a view similar to the view in FIG. 12, but with the use of a side rail/bridge brace securement arrangement like that in FIG. 1. Like FIG. 12, the embodiment shown in FIG. 13 has a monolithic extension support 322. Upper and lower bridge braces 338 and 340 thus sandwich the left and right side rails 358 into the aforementioned secure arrangement.

As the preferred design of the present invention features a tubular extension support for insertion in a square hitch, FIG. 14 illustrates an adaptor arrangement for converting a flat or platform tow ball hitch arrangement to one suited for reception of a tubular extension support. In FIG. 14 square hitch adaptor 601 includes a square hitch section 603 with a fixedly secured plate member 605 that has hole 607 designed to line up with hole 609 in platform 611. Thus the tow ball head member 613 can be inserted and locked in position with nut 615.

Although an adapter arrangement like that shown in FIG. 14 is possible when faced with a tow ball platform arrangement, from the standpoint of avoiding additional components to the self contained modular carrier structures as described above, an extension support such as 22 in FIG. 1 can be directly attached to the tow ball platform or the like through use of the first modular carrier connector set of holes and a tow ball pin conector 713 and bolt 715.

FIG. 16 shows rail 58 and cradle 70 as in the above described embodiment plus an added wheel hold down device 800 which features a flexible member 801 which in a preferred embodiment is a nylon continuous strap that has a width that fits between the side edge of plate 74 and U-bolt 76 and is pinched between said cradle 70 and supporting slide rail 58 upon said fix-in-position device (a U-bolt arrangement in the illustrated embodiment) being placed in a locked state. FIG. 16 also shows metal D-loop 803 which facilitates a tightening down of strap 800 around a bike wheel. Following a looping through a VELCRO hook and fastener pad connection arrangement is provided or similar connection means to prevent inadvertent release of a connected loop. Hold down device is particularly useful for use with the singular modular structure shown in FIG. 16 as it takes into consideration that there may only be connected to a vehicle a single modular structure in which case there would not be two eye loops for receipt of the end of tie down strap 275. By providing instead, however, the illustrated strap assembly 800 there is provided a hold down device that can be used to lock down both wheels of a bike at the two different cradle locations and which can also be used to supplement a tie down strap arrangement like that shown in FIG. 13

What is claimed is:

1. A carrier device, comprising:
a first modular carrier structure having an extension support which includes, at a first end, means for connection with a vehicle and first modular member connection means for providing for additional modular carrier structure attachment, and having at a second end second modular member connection means for providing for additional modular carrier structure attachment, with said first and second modular member connection means of said extension support having a common arrangement so as to be functionally interchangeable, and an object support structure which is supported by said extension support.

2. A carrier device as recited in claim 1 wherein said object support structure includes a first brace connected with said extension support and a side rail structure to which the brace is attached.

3. A carrier device as recited in claim 2 wherein said first brace is a first bridge brace having a central portion connected to said extension support and external sections connected to an under surface of said side rail structure.

4. A carrier device as recited in claim 3 wherein said object support structure includes a second bridge brace having a central portion connected to said extension support and external sections connected to an upper surface of said side rail structure.

5. A carrier device as recited in claim 4 wherein at least one of said bridge braces is a centralized bridge brace structure in that said external sections thereof each extend less than 4 inches out from an adjacent most side section of said extension support.

6. A carrier device as recited in claim 4 wherein said side rail structure includes a first side rail and a second side rail, with the first side rail having an internal end juxtaposed to said extension support and sandwiched between above and below positioned external sections of said first and second bridge braces, and second side rail having an internal end juxtaposed to said extension support and sandwiched between above and below positioned external sections of said first and second bridge braces.

7. A carrier device as recited in claim 6 wherein said first and second side rails have a common design and are in contact or within ⅛ of an inch of contact with respect to said extension support, and wherein said bridge braces have a common design.

8. A carrier device as recited in claim 6 wherein said extension support includes a set of aligned holes and said bridge braces each include an aperture positioned for alignment with said set of aligned holes in said extension support, and said carrier device further comprising a connector that extends through each hole of said set of aligned holes and within each of said apertures of said bridge braces.

9. A carrier device as recited in claim 8 wherein said connector is a central bolt/nut combination, and each of said side rails including a set of aligned side rail holes at respective internal ends of said side rails, and each of the external sections of said bridge braces include an aperture positioned in alignment with respective vertically aligned side rail holes of a corresponding side rail sandwiched therebetween, and said carrier device further comprising side rail bolt/nut combinations which extend through respective vertically aligned sets of the side rail holes and aligned apertures of corresponding above and below bridge braces.

10. A carrier device as recited in claim 6 further comprising a first bike holding member and a second bike holding member respectively supported by the side rails to opposite sides of said extension support, and wherein said first bike holder is adjustably supported on one of said side rails and free to slidably adjust from an external end of said one of said support rails to said bridge braces.

11. A carrier device as recited in claim 10 wherein said first bike holder is free to slide along said one of said support rails from a free end thereof to a location at least 4 inches from said extension support without obstruction with respect to the bike carrier in a fully assembled state.

12. A carrier device as recited in claim 11 wherein said second bike holder is adjustably supported on an oppositely positioned one of said two side rails so as to be freely slidable from a free end of said oppositely positioned one of said two side rails to a location at least 4 inches from said extension section without obstruction.

13. A carrier device as recited in claim 10 wherein said first bike holding member includes a V-shaped bar section having a pair of legs extending off from a corresponding pair of base extensions, and said base extensions being supported by a sliding member designed for side rail sliding contact, and said first bike holding member including a fix-in-position device for precluding movement of said sliding member, and said V-shaped bar section extending at a greater angle outward of a vertical plane than that assumed by said base extensions.

14. A carrier device as recited in claim 1 further comprising a second modular carrier structure having an extension support which includes, at a first end, means for connection with a vehicle and first modular member connection means for providing for additional modular carrier structure attachment, and having at a second end second modular member connection means for providing for additional modular carrier structure attachment, and said second modular carrier structure further including an object support structure which is supported by the extension support of said second modular carrier structure, and said first modular member connection means of said second modular carrier structure is connected with the second modular connection means of said first modular carrier structure in a vertically offset arrangement wherein the extension support of said second modular carrier structure has an upper surface above an upper surface of the extension support of said first modular carrier structure.

15. A carrier device as recited in claim 14 wherein the extension support of each of said first and second modular carrier structures is a tubular member and the means for connection to a vehicle for each of said first and second modular carrier structures includes a first set of aligned holes, and said first modular member connection means of both said first and second modular carrier structures includes a respective set of aligned holes, and said second modular member connection means of both said first and second modular carrier structures also includes a respective set of aligned holes, and said carrier device further comprising a connector which is designed to extend through aligned holes of the first modular connection means of said second modular carrier structure and through the below positioned aligned holes of the second modular member connection means of said first modular carrier structure.

16. A carrier device as recited in claim 14 wherein said first and second modular carrier structures are interchangeable with respect to which connects the vehicle and which connects to the modular carrier structure connected to the vehicle.

17. A carrier device as recited in claim 16 wherein each of said first and second modular carrier structures has a same design.

18. A carrier device as recited in claim 17 further comprising a third modular carrier structure having an extension support which includes, at a first end, means for connection with a vehicle and first modular member connection means for providing for additional modular carrier structure attachment, and having at a second end second modular member connection means for providing for additional modular carrier structure attachment, said third modular carrier structure further including an object support structure which is supported by the extension support of said third modular carrier structure, said third modular carrier structure also having a same design as said first and second modular carrier structures, and said third modular carrier structure being arranged so as to be vertically offset from said second modular carrier structure upon said third modular carrier structure being interconnected with said second modular carrier structure.

19. A carrier device as recited in claim 18 further comprising a fourth modular carrier structure having an extension support which includes, at a first end, means for connection with a vehicle and first modular member connection means for providing for additional modular carrier structure attachment, and having at a second end second modular member connection means for providing for additional modular carrier structure attachment, said fourth modular carrier structure further including an object support structure which is supported by said fourth modular carrier structure, said fourth modular carrier structure being also of a same design as said first, second and third modular carrier structures and said fourth modular carrier structure being arranged so as to be vertically offset from said third modular carrier structure upon said fourth modular carrier structure being interconnected with said third modular carrier structure.

20. A carrier device as recited in claim 1 further comprising a second modular carrier structure, said second modular carrier structure having an extension support which includes, at a first end means for connection with a vehicle and first modular member connection means for providing for additional modular carrier structure attachment, and having at a second end second modular member connection means for providing for additional modular carrier structure attachment, said second modular carrier structure further including an object support structure which is supported by the extension support of said second modular carrier structure, and said second modular carrier structure being releasaby connected with said first modular carrier structure such that said second modular carrier structure assumes a stacked, vertically offset relationship with respect to said first modular carrier structure.

21. A carrier device as recited in claim 20 wherein each carrier device has the same design so as to be interchangeable in position with respect to a supporting vehicle without alteration of carrier function.

22. A carrier device as recited in claim 21 further comprising a third modular carrier structure, said third modular carrier structure having an extension support which includes, at a first end means for connection with a vehicle and first modular member connection means for providing for additional modular carrier structure attachment, and having at a second end second modular member connection means for providing for additional modular carrier structure attachment, said third modular carrier structure further including an object support structure which is supported by the extension support of said third modular carrier structure, and said third modular carrier structure being releasaby connected with said second modular carrier structure such that said third modular carrier structure assumes a stacked, vertically offset and above relationship with respect to said second modular carrier.

23. A carrier device as recited in claim 22 further comprising a fourth modular carrier structure, said fourth modular carrier structure having an extension support which includes, at a first end means for connection with a vehicle and first modular member connection means for providing for additional modular carrier structure attachment, and having at a second end second modular member connection means for providing for additional modular carrier structure attachment, said fourth modular carrier structure further including an object support structure which is supported by the extension support of said fourth modular carrier structure, and said fourth modular carrier structure being releasaby connected with said third modular carrier structure such that said fourth modular carrier structure assumes a stacked, vertically offset and above relationship with respect to said third modular carrier.

24. A carrier device as recited in claim 1 wherein said first modular member connection means includes a pair of aligned holes having a first central axis and being formed in the first end of said extension support, and said means for connection with a vehicle includes a second pair of aligned holes having a second central axis and being formed in the first end of said extension support, and said second modular member connection means includes a third pair of aligned holes having a third central axis and being formed in the second end of said extension support, and said first and third central axis being parallel to each other.

25. A carrier device as recited in claim 24 wherein said first and second axis fall on a common plane.

26. A carrier device as recited in claim 24 wherein said first and second axis are perpendicular to each other.

27. A carrier device as recited in claim 1 wherein said extension support has a longitudinal axis extending from the first end to the second end of said extension support, and said object support structure includes a bike carrier rail extending perpendicular to the longitudinal axis, and said rail, which is a first one out along the longitudinal axis of said extension support, is positioned closer to said second modular connection means than said first modular connection means along the longitudinal axis.

28. A carrier device as recited in claim 1 wherein said second modular member connection means includes a pair of aligned holes.

29. A carrier device as recited in claim 1 wherein said object support structure includes a bike support rail and said extension support supports only a single bike support rail.

30. A carrier device as recited in claim 29 wherein said extension support has a length of 6 to 18 inches in a direction of elongation.

31. A bike carrier device, comprising:
   an extension support;
   a side rail structure supported by said extension support and having side rail sections extending to opposite sides of said extension support and each of said side rail sections being supported by said extension support,
   a pair of wheel holding members positioned on said side rail structure on opposite sides of said extension support and at least one of said wheel holding members comprising a cradle adapted for slidable adjustment on one of said supporting side rail sections; and said cradle including a releasable fix-in-position device for fixing said cradle in a desired position on said side rail structure, and
   a second of said wheel holding members comprises a flexible strap member; and a bridge structure having an upper bridge member and a lower bridge member in a sandwiching relationship with said extension support with said bridge members securing said first and second side rail sections to said extension support.

32. A bike carrier as recited in claim 31 wherein said flexible strap includes securement means for fixing one section of the strap to another section so as to form a wheel locking loop, and said cradle being slideably supported by a supporting one of said side rail sections and free to slide over at least a majority of a length of said supporting one of said side rail sections.

33. A bike carrier as recited in claim 31 wherein said cradle includes a V-shaped section and a pair of base sections, and said V-shaped section extends from vertical at a first angle between 30 and 60 degrees and said base sections extend at 0 to 10 degrees with respect to a vertical plane and said side rail sections each having a planar upper surface which is below a planar upper surface of said extension support.

34. A carrier device, comprising:
   a first modular carrier structure having an extension support which includes, at a first end, means for connection with a vehicle and first modular member connection means for providing for additional modular carrier structure attachment, and having at a second end second modular member connection means for providing for additional modular carrier structure attachment, and an object support structure supported by said extension support,
   said object support structure including a first brace connected with said extension support and a side rail structure to which the brace is attached, and said first brace is a first bridge brace having a central portion connected to said extension support and external sections connected to an under surface of said side rail structure, and said object support structure further includes a second bridge brace having a central portion connected to said extension support and external sections connected to an upper surface of said side rail structure.

35. A carrier device, comprising:
   a first modular carrier structure having an extension support which includes, at a first end, means for connection with a vehicle and first modular member connection means for providing for additional modular carrier structure attachment, and having at a second end second modular member connection means for providing for additional modular carrier structure attachment, and
   an object support structure supported by said extension support;
   a second modular carrier structure having an extension support which includes, at a first end, means for connection with a vehicle and first modular member connection means for providing for additional modular carrier structure attachment, and having at a second end second modular member connection means for providing for additional modular carrier structure attachment, and said second modular carrier structure further including an object support structure which is supported by the extension support of said second modular carrier structure, and
   said first modular member connection means of said second modular carrier structure is connected with the second modular connection means of said first modular carrier structure in a vertically offset arrangement wherein the extension support of said second modular carrier structure has an upper surface above an upper surface of the extension support of said first modular carrier structure, and wherein the extension support of each of said first and second modular carrier structures is a tubular member and the means for connection to a vehicle for each of said first and second modular carrier structures includes a first set of aligned holes, and said first modular member connection means of both said first and second modular carrier structures includes a respective set of aligned holes, and said second modular member connection means of both said first and second modular carrier structures also includes a respective set of aligned holes, and said carrier device further comprising a connector which is designed to extend through the aligned holes of the first modular connecting means of said second modular carrier structure and through the below positioned aligned holes of the second modular member connection means of said first modular carrier structure.

36. A carrier device, comprising:
   a tubular extension support having a first set of modular connection aligned holes at a first end and a second set of modular connection aligned holes at a second end, said tubular extension further comprising a pair of aligned vehicle attachment holes at said first end; and
   a bike support rail structure which is supported by said extension supports;
   wherein said bike support rail structure comprises first and second support rails extending to opposite sides of said tubular extension, and a sandwiching support bridge assembly comprising an upper bridge member contacting an upper surface of said tubular extension and an upper surface of each of said support rails and lower bridge member contacting a lower surface of said tubular extension and a lower surface of each of said support rails.

37. A carrier device as recited in claim 36 wherein said tubular extension support supports only a single bike support rail which extends perpendicularly to a direction of elongation of said extension support.

38. A carrier device as recited in claim 36 wherein said pair of aligned vehicle attachment holes are formed in a first opposing pair of side walls in said tubular extension and said first set of modular connector aligned holes is arranged in a second set of opposing side walls in said tubular extension.

* * * * *